US010509700B2

(12) United States Patent
Honda et al.

(10) Patent No.: US 10,509,700 B2
(45) Date of Patent: Dec. 17, 2019

(54) STORAGE SYSTEM AND STORAGE MANAGEMENT METHOD

(71) Applicant: HITACHI, LTD., Tokyo (JP)

(72) Inventors: Kiyoshi Honda, Tokyo (JP); Naoto Shiino, Kanagawa (JP); Toru Ando, Kanagawa (JP); Keiichiro Uchida, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 108 days.

(21) Appl. No.: 15/743,321

(22) PCT Filed: Nov. 10, 2015

(86) PCT No.: PCT/JP2015/081607
§ 371 (c)(1),
(2) Date: Jan. 10, 2018

(87) PCT Pub. No.: WO2017/081748
PCT Pub. Date: May 18, 2017

(65) Prior Publication Data
US 2018/0196718 A1      Jul. 12, 2018

(51) Int. Cl.
*G06F 11/07* (2006.01)
*G06F 11/14* (2006.01)
*G06F 3/06* (2006.01)

(52) U.S. Cl.
CPC ........ *G06F 11/1441* (2013.01); *G06F 3/0614* (2013.01); *G06F 3/0658* (2013.01); *G06F 3/0689* (2013.01)

(58) Field of Classification Search
CPC .................. G06F 11/0793; G06F 11/1402

USPC .................................................. 714/6.22, 15
See application file for complete search history.

(56) References Cited

U.S. PATENT DOCUMENTS

| | | | |
|---|---|---|---|
| 2007/0028041 A1* | 2/2007 | Hallyal | G06F 11/1092 711/114 |
| 2009/0077416 A1* | 3/2009 | D'Souza | G06F 11/1076 714/6.12 |
| 2009/0204743 A1 | 8/2009 | Inoue et al. | |
| 2009/0217086 A1 | 8/2009 | Tanaka et al. | |
| 2013/0047028 A1 | 2/2013 | Daikokuya et al. | |

(Continued)

FOREIGN PATENT DOCUMENTS

| JP | 2008-217234 A | 9/2008 |
|---|---|---|
| JP | 2009-187483 A | 8/2009 |

(Continued)

OTHER PUBLICATIONS

International Search Report of PCT/JP2015/081607 dated Feb. 9, 2016.

*Primary Examiner* — Chae M Ko
(74) *Attorney, Agent, or Firm* — Mattingly & Malur, PC

(57) ABSTRACT

A storage system has a storage controller and a RAID group. The storage controller has policy management information such that one failure recovery process among a plurality of differing failure recovery processes is associated with each RAID group, and when an error in a command issued to a RAID group is detected, the failure recovery process associated with the RAID group to which the command was issued is specified on the basis of the policy management information, and the specified failure recovery process is executed.

18 Claims, 16 Drawing Sheets

(56) References Cited

U.S. PATENT DOCUMENTS

| | | | |
|---|---|---|---|
| 2015/0033065 A1* | 1/2015 | Canepa | G06F 11/1008 714/6.11 |
| 2015/0169238 A1* | 6/2015 | Lee | G06F 12/0871 711/103 |
| 2015/0378858 A1 | 12/2015 | Ishizaka et al. | |
| 2017/0147209 A1* | 5/2017 | Lee | G06F 3/064 |
| 2017/0220410 A1* | 8/2017 | Kim | G06F 11/1072 |
| 2017/0315891 A1* | 11/2017 | Park | G06F 11/2094 |
| 2017/0330626 A1* | 11/2017 | Sakui | G11C 16/08 |
| 2018/0188954 A1* | 7/2018 | Chu | G06F 11/0727 |

FOREIGN PATENT DOCUMENTS

| | | |
|---|---|---|
| JP | 2009-205316 A | 9/2009 |
| JP | 2010-026812 A | 2/2010 |
| JP | 2013-041143 A | 2/2013 |
| WO | 2014/132373 A1 | 9/2014 |

* cited by examiner

Customer policy management table — 1100

| RAID Group ID 1101 | RAID Level 1102 | Drive Type 1103 | Operation performance policy 1104 | Operation cost policy 1105 | Status 1106 | System error 1107 | Data error 1108 | I/F error 1109 | Timeout error 1110 |
|---|---|---|---|---|---|---|---|---|---|
| F-1 | 1 (2D+2D) | SSD | High performance | Unlimited | Normal | L1 | L1 | L1 | L1 |
| F-2 | 5 (7D+1P) | SSD | Enterprise | Optimization | Fallback | L5 | L4 | L5 | L5 |
| S-1 | 5 (7D+1P) | SAS HDD | Enterprise | Optimization | Fallback | L2 | L2 | L2 | L2 |
| S-2 | 5 (15D+1P) | SAS HDD | Enterprise | Performance | Normal | L4 | L4 | L4 | L4 |
| N-1 | 6 (30D+2P) | NL-SAS | Balance | Optimization | Normal | L5 | L4 | L4 | L4 |
| N-2 | 6 (30D+2P) | NL-SAS | Capacity is given priority | Cost | Normal | L5 | L4 | L5 | L5 |
| N-3 | 6 (30D+2P) | NL-SAS | Archive | Cost Minimum | Normal | L7 | L7 | L7 | L7 |
| ... | | | | | | | | | |

Fig. 4

Drive failure management table 1200

| RAID Group ID 1201 | Drive Num 1202 | Status 1203 | System error count (<5) 1204 | Data error count (<5) 1205 | I/F error count (<5) 1206 | Timeout error count (<5) 1207 |
|---|---|---|---|---|---|---|
| F-2 | 01 | Active | 0 | 0 | 0 | 0 |
| | 02 | Active | 0 | 0 | 0 | 1 |
| | 03 | Active | 0 | 0 | 1 | 1 |
| | 04 | Active | 0 | 0 | 0 | 0 |
| | 05 | Close | 5 | 0 | 1 | 2 |
| | 06 | Active | 0 | 0 | 0 | 0 |
| | 07 | Active | 0 | 0 | 0 | 0 |
| | 08 | Active | 0 | 1 | 0 | 0 |

| RAID Group ID 1201 | Drive Num 1202 | Status 1203 | System error count (<10) 1204 | Data error count (<10) 1205 | I/F error count (<10) 1206 | Timeout error count (<10) 1207 |
|---|---|---|---|---|---|---|
| S-1 | 01 | Active | 0 | 0 | 0 | 0 |
| | 02 | Active | 1 | 1 | 0 | 0 |
| | 03 | Active | 0 | 0 | 0 | 0 |
| | 04 | Active | 0 | 0 | 0 | 0 |
| | 05 | Active | 0 | 0 | 1 | 0 |
| | 06 | Active | 0 | 0 | 0 | 0 |
| | 07 | Diagnosis | 0 | 2 | 10 | 2 |
| | 08 | Active | 0 | 0 | 0 | 0 |

Fig. 5

PHY status information 1300

| # | Link Error type | Port#0_Count | Port#1_Count |
|---|---|---|---|
| 1 | Invalid Dword Count | 0x00000000 | 0x00000000 |
| 2 | Running Disparity Error Count | 0x00000000 | 0x00000000 |
| 3 | Loss Of Dword Synchronization | 0x00000000 | 0x00000000 |
| 4 | PHY Reset Problem | 0x00000000 | 0x00000000 |

Fig. 14

| Pattern | EXP-A | | Drive | | EXP-B | | Fault site estimation |
|---|---|---|---|---|---|---|---|
| | P1 | P3 | P1 | P2 | P2 | P4 | |
| 1 | Increased | Increased | Increased | 0 | 0 | 0 | EXP-A |
| 2 | Increased | 0 | Increased | Increased | Increased | 0 | Drive |
| 3 | Increased (or 0) | 0 | 0 (or Increased) | 0 | 0 | 0 | ? |

Fig. 15

STORAGE SYSTEM AND STORAGE MANAGEMENT METHOD

TECHNICAL FIELD

This invention relates generally to a technology for a storage system.

BACKGROUND ART

A storage system is designed such that a plurality of drives (for example, Hard Disk Drives (HDDs)) have a Redundant Arrays of Inexpensive Disks (RAID) configuration or a path between a storage controller and a drive is multiplexed in order to enhance fault tolerance. PTL 1 discloses a storage subsystem in which when a fault site is detected in a connection path for a drive unit, the connection path is reconstructed so as to bypass or avoid the fault site.

CITATION LIST

Patent Literature

[PTL 1]
Japanese Patent Application Publication No. 2009-187483

SUMMARY OF INVENTION

Technical Problem

In operation of a storage system, a drive in which a failure has been detected is closed and replaced. However, the cause of the failure is not always the drive, and may be another factor (for example, another device or network). In such a case, replacement cost for the drive is wasted. On the other hand, if the cause of the failure is sought each time the failure is detected, the performance and operating rate of the storage system reduce.

It is an object of this invention to provide a storage system and a storage management method capable of adjusting operation cost and performance depending on purposes of customers. It is another object of this invention to provide a storage system and a storage management method capable of isolating failure recovery and failure cause.

Solution to Problem

A storage system according to one embodiment includes: a plurality of RAID groups constructed by a plurality of storage devices; and a storage controller configured to control the RAID groups. The storage controller has policy management information in which each RAID group is associated with any failure recovery processing among a plurality of different kinds of failure recovery processing. When an error for a command issued to the RAID group is detected, the storage controller specifies, on the basis of policy management information, failure recovery processing associated with the RAID group to which the command is issued, and executes the specified failure recovery processing.

Advantageous Effects of Invention

According to this invention, in the storage system, operation cost and performance can be adjusted depending on purposes. Further, in the storage system, failure recovery and failure cause can be isolated.

BRIEF DESCRIPTION OF DRAWINGS

FIG. 4 illustrates a configuration example of a customer policy management table.

FIG. 5 illustrates a configuration example of a drive failure management table.

FIG. 14 illustrates a configuration example of PHY status information.

FIG. 15 is a diagram for describing a method of isolating a fault site.

DESCRIPTION OF EMBODIMENTS

One embodiment is now described. In the following description, information is sometimes described with the expression "xxx table", "xxx queue", or "xxx list", but information may be expressed by any data structure. In other words, "xxx table", "xxx queue", or "xxx list" can be referred to as "xxx information" in order to indicate that information is independent from the data structure.

Further, in the following description, processing is sometimes described with a "program" being its subject. When executed by a processor (for example, CPU (Central Processing Unit)), the program performs predetermined processing while appropriately using at least one of storage resources (for example, memory) and a communication interface device, and hence the subject of the processing may be the processor or an apparatus having the processor. Part or whole of processing performed by the processor may be performed by a hardware circuit. The computer program may be installed from a program source. The program source may be a program distribution server or a storage medium (for example, portable storage medium).

Further, in the following description, an aggregate of one or more computers configured to manage at least one apparatus included in a computer system is sometimes referred to as "management system".

When the management computer displays display information, the management computer may be a management system. Further, a combination of the management computer and a display computer may be a management system. Further, a plurality of computers may implement processing similar to that of the management computer in order to speed up the management processing and increase the reliability. In this case, the plurality of computers (may include a display computer when display is performed by the display computer) may be a management system. In this embodiment, the management computer is a management system. Further, the display of information by the management computer may be implemented by displaying information on a display device included in the management computer or by transmitting display information to a display computer (for example, client) coupled to the management computer (for example, server). In the latter case, information indicated by the display information is displayed on a display device included in the display computer by the display computer.

Further, in the following description, reference symbols are sometimes used in order to distinguish the same type of elements, such as "drive 20a" and "drive 20b", and only a common number among reference symbols is sometimes used in order not to distinguish the same type of elements, such as "drive 20".

Figure 1:
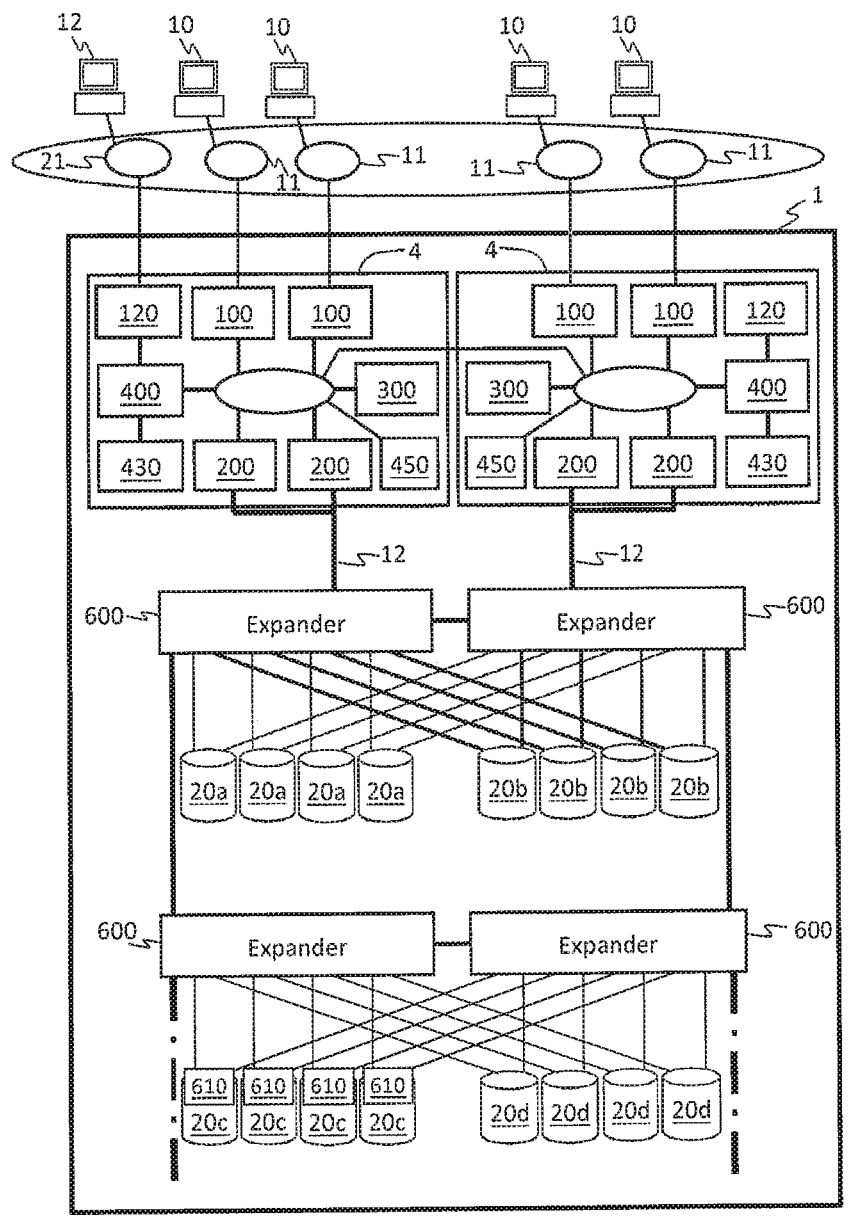
FIG. 1 illustrates a configuration example of a storage system according to one embodiment.

FIG. 1 illustrates a configuration example of a storage system according to one embodiment.

A storage system 1 includes a plurality of storage controllers 4, a plurality of Serial Attached SCSI (SAS) expanders (referred to as "EXPs") 600, and a plurality of drives 20. The drive 20 is an example of a non-volatile storage device. Examples of the drive 20 include a Solid State Drive (SSD) 20a, a SAS-HDD 20b, and a NearLine (NL)-SAS-HDD 20d.

Each drive 20 is coupled to at least two EXPs 600 in a bidirectionally communicable manner. Thus, communication paths between the storage controllers 4 and the drives 20 are made redundant. Note that a SATA drive 20c can be coupled to the EXP 600 via a predetermined conversion switch 610.

Each EXP 600 is coupled to another EXP 600 or the storage controller 4. In other words, the plurality of EXPs 600 are coupled in multiple stages. Also in this manner, the communication paths between the storage controllers 4 and the drives 20 are made redundant.

The storage controller 4 combines the plurality of drives 20 coupled to the EXP 600 to construct a RAID group. Then, the storage controller 4 can access each drive 20 belonging to the RAID group via ant one of the plurality of redundant communication paths and the EXP 600.

The storage controller 4 may include a CPU 400, a memory 430, a shared memory 450, a cache memory 300, a channel control unit 100, a disk control unit 200, and a management I/F 120. These elements may be coupled to a bidirectionally communicable internal bus.

The management I/F 120 is bidirectionally communicable to a management computer 12 via a communication path 21, and controls transmission and reception of data between the storage controller 4 and the management computer 12. The management computer 12 may be included in the storage system 1.

The channel control unit 100 is bidirectionally communicable to a host computer 10 via a communication path 11, and controls transmission and reception of data between the storage controller 4 and the host computer 10. The drive control unit 200 is bidirectionally communicable to the drive 20 via a communication path 12, and controls transmission and reception of data between the storage controller 4 and the drive 20. Examples of a control protocol for the drive 20 include SCSI. Examples of a communication protocol for the communication path 12 include Internet Protocol (IP) and Fibre Channel.

In the cache memory 300, I/O data to be exchanged with the drive 20 and the host computer 10 may be cached. As a result, the performance of an I/O response of the storage system 1 with respect to the host computer 10 can be improved. In the shared memory 450, data to be shared by each element coupled to an internal bus may be stored.

In the memory 430, programs and data for implementing various kinds of functions of the storage controller 4 are stored. The numbers of the cache memories 300, the shared memories 450, and the memories 430 may be one. Examples of these memories include Dynamic Random Access Memory (DRAM), Ferroelectric Random. Access Memory (FeRAM), and Magnetoresistive Random Access Memory (MRAM).

The CPU 400 executes programs stored in the memory 430 to implement various kinds of functions of the storage controller 4 described later.

Figure 2:
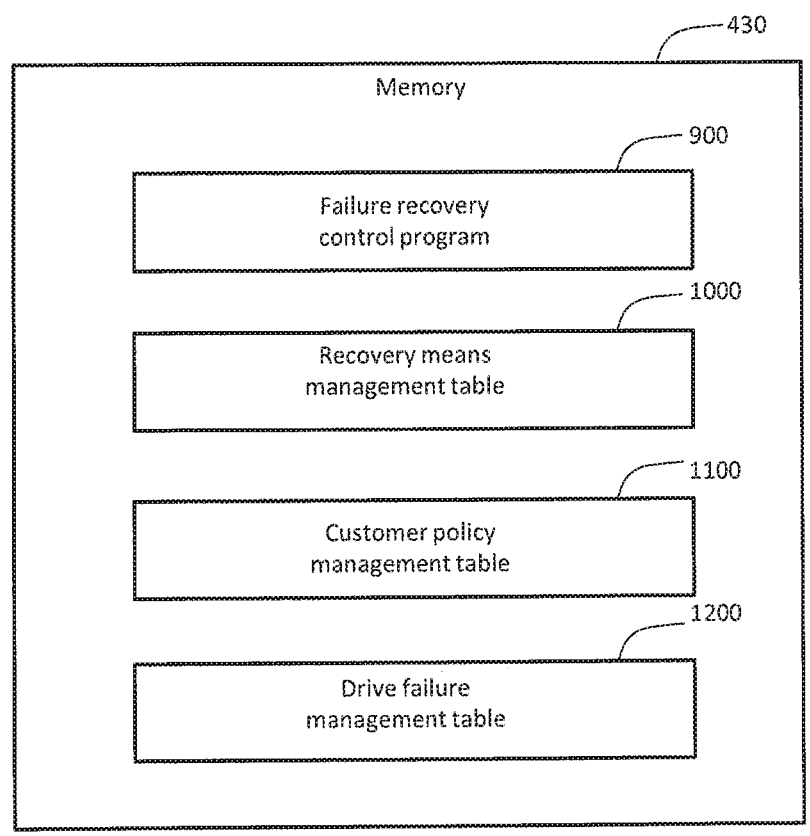
FIG. 2 is an example of functions and data of a storage controller.

FIG. 2 is an example of functions and data of the storage controller 4.

In the memory 430 of the storage controller 4, a failure recovery control program 900, a recovery means management table 1000, a customer policy management table 1100, and a drive failure management table 1200 may be stored.

When executed by the CPU 400, the failure recovery control program 900 implements a function of recovering from a failure occurring in the storage system 1. In the description of the embodiment, processing with the storage controller 4 being its subject may be processing executed by the failure recovery control program 900 or the CPU 400.

In the recovery means management table 1000, information on means of a plurality of different kinds of failure recovery processing for recovering from a failure (referred to as "recovery means") is stored. In the customer policy management table 1100, information on customer operation policy for each RAID group is stored. In the drive failure management table 1200, information on errors that have occurred in drives 20 belonging to a RAID group.

Figure 3:
FIG. 3 illustrates a configuration example of a recovery means management table.

FIG. 3 illustrates a configuration example of the recovery means management table 1000.

Recovery means for a failure includes retry processing 1002 for retransmitting a failed command, logical reset processing 1003 for executing a logical reset, and physical reset processing 1004 for executing a physical reset. The logical reset processing 1003 may be, for example, processing of initializing a device (for example, drive 20) in which a failure has occurred. The physical reset processing 1004 may be, for example, processing of rebooting a device (for example, drive 20) in which a failure has occurred (that is, processing of powering on and off).

In the recovery means management table 1000, recovery means levels 1001 obtained by a combination of the recovery means are defined. The recovery means level 1001 maybe set as an item value of a customer policy management table 1100 described later.

As the recovery means level 1001 becomes larger, the possibility of failure recovery becomes higher. The recovery means level 1001 may be defined such that recovery processing time becomes longer as the recovery means level 1001 becomes larger (see 1005 in FIG. 3). The recovery means level 1001 may be defined as follows, for example.

A recovery means level 1001 of "L0" indicates that none of the retry processing 1002, the logical reset processing 1003, and the physical reset processing 1004 is performed. In other words, even when a failure occurs, recovery processing and closing processing are not performed. This level may be applied to an error that has already been recovered in the drive 20 and an error that does not need to be recovered from the storage controller 4.

A recovery means level 1001 of "L1" indicates that only the retry processing 1002 is performed. When an error is not recovered, closing processing is performed to switch to the use of a redundant system. A processing time required for this processing is relatively short. The possibility of recovery in this case is relatively low.

A recovery means level 1001 of "L2" indicates that only the logical reset processing 1003 is performed. When an error is recovered, a failed command is retransmitted. When an error is not recovered, closing processing is performed to switch to the use of a redundant system. A processing time required for this processing is longer than that of "L1". The possibility of recovery in this case is higher than that of "L1".

A recovery means level 1001 of "L3" indicates that only the physical reset processing 1004 is performed. When an error is recovered, a failed command is retransmitted. When an error is not recovered, closing processing is performed to switch to the use of a redundant system. A processing time required for this processing is longer than that of "L2". The possibility of recovery in this case is higher than that of "L2".

A recovery means level 1001 of "L4" indicates that the retry processing 1002 is performed, and when an error is not recovered by the retry processing 1002, the logical reset processing 1003 is performed.

A recovery means level 1001 of "L5" indicates that the retry processing 1002 is performed, and when an error is not recovered by the retry processing 1002, the physical reset processing 1004 is performed.

A recovery means level 1001 of "L6" indicates that the logical reset processing 1003 is performed, and when an error is not recovered by the logical reset processing 1003, the physical reset processing 1004 is performed.

A recovery means level 1001 of "L7" indicates that the retry processing 1002 is performed, and when an error is not recovered by the retry processing 1002, the logical reset processing 1003 is performed, and when an error is not recovered by the logical reset processing 1003, the physical reset processing 1004 is performed.

A recovery means level 1001 of "L8" indicates that the recovery processing is not performed but closing processing is immediately performed to switch to the use of a redundant system.

FIG. 4 illustrates a configuration example of the customer policy management table 1100.

The customer policy management table 1100 manages customer policies for each RAID group. The customer policy management table 1100 may have, as item values (column values), a RAID group ID 1101, a RAID level 1102, a drive type 1103, an operation performance policy 1104, an operation cost policy 1105, a status 1106, a system error 1107, a data error 1108, an I/F error 1109, and a timeout error 1110.

The RAID group ID 1101 is an identifier of a RAID group.

The RAID level 1102 is the value representing a RAID level of the RAID group having the ID 1101. The RAID level may include the value representing a drive configuration of the RAID group having the ID 1101.

The drive type 1103 is the value representing the type of a drive 20 constituting the RAID group having the ID 1101. Examples of the drive type 1103 include SSD, SAS-HDD, and NL-SAS-HDD.

The operation performance policy 1104 is the value representing a performance policy requested by a customer for the RAID group having the ID 1101. The operation performance policy 1104 may be a value that becomes smaller as the priority of performance becomes higher, and vice versa. Alternatively, the operation performance policy 1104 may be the value related to I/O per Second (IOPS). Alternatively, the operation performance policy 1104 may be defined by names such as "high performance", "enterprise", "balance", "capacity is given priority", and "archive" in descending order of priority of performance.

The operation cost policy 1105 is the value representing a cost policy requested by a customer for the RAID group having the ID 1101. The operation cost policy may be a value that becomes larger as the priority of cost becomes higher, and vice versa. Alternatively, the operation cost policy 1105 may be the value related to price. Alternatively, the operation cost policy 1105 may be the value corresponding to a maintenance contract model for a customer. Alternatively, the operation cost policy 1105 may be the value calculated on the basis of the failure rate and price of each device (for example, drive) in the storage system 1. This calculation may take operation times of the storage system 1 and the drive 20 into consideration. Alternatively, the operation cost cost policy 1105 may be defined by names such as "cost unlimited", "performance prioritized", "cost optimized", "cost prioritized", and "cost minimum" in ascending order of cost.

A customer may determine or select the operation performance policy 1104 and the operation cost policy 1105 for a RAID group to be used. Alternatively, the storage controller 4 may determine the operation performance policy 1104 and the operation cost policy 1105 that are assumed to be requested by a customer for the RAID group ID 1101 on the basis of the RAID level 1102 and/or the drive type 1103. For example, when the RAID level 1102 is "1" and the drive type 1103 is "SSD" having a relatively high IOPS, the storage controller 4 may determine the operation performance policy 1104 to "high performance (performance most prioritized)" and the operation cost policy 1105 to "cost unlimited". For example, when the RAID level 1102 is "6" and the drive type 1103 is "NL-HDD", the storage controller 4 may determine the operation performance policy 1104 to "capacity is given priority" and the operation cost policy 1105 to "cost prioritized".

The status 1106 is the value representing the status of a RAID group having the ID 1101. Examples of the status 1106 include "normal" indicating that the RAID group is normally operating and "fallback" indicating that the RAID group is subjected to fallback.

The system error 1107 (may be referred to as hardware error) is the value representing the recovery means level 1001 to be executed when a system error occurs in the RAID group having the ID 1101. The system error may be an error that occurs in a storage area in which programs and data for controlling the drive 20 are stored (that is, system area) or in a hardware mechanism of the drive 20.

The data error 1108 is the value representing the recovery means level 1001 to be executed when a data error occurs in the RAID group having the ID 1101. The data error may be an error that occurs in a storage area in which user data of the drive 20 is stored (that is, user area).

The I/F error 1109 is the value representing the recovery means level 1001 to be executed when an I/F error occurs in the RAID group having the ID 1101. The I/F error may be an error that occurs in a network I/F of the drive 20.

The timeout error 1110 is the value representing the recovery means level 1001 to be executed when a timeout error occurs in the RAID group having the ID 1101.

The above-mentioned system error 1107, data error 1108, and I/F error 1109 may be referred to when an error that has failed to be recovered in the drive 20 (unrecoverable error) has occurred. Further, the system error 1107, the data error 1108, and the I/F error 1109 when an error that has already been recovered in the drive 20 has occurred may each indicate a recovery means level 1001 of "L0". This is because the error has already been recovered and it is unnecessary for the storage controller 4 to perform another recovery processing.

The recovery means level 1001 set for each of the errors 1107, 1108, and 1109 in the RAID group may be automatically determined by the storage controller 4 on the basis of the operation performance policy 1104 and/or the operation cost policy 1105 for the RAID group.

For example, when performance is given priority over cost in the operation policy, the storage controller 4 may determine the recovery means level 1001 for each error to "L1" or "L2", which indicates that the recovery processing is completed in a relatively short period.

For example, when cost is given priority over performance in the operation policy, the storage controller 4 may determine the recovery means level 1001 for each error to "L3", " L5", " L6", or "L7", which indicates a relatively high possibility of recovery.

For example, when "cost minimum" is set in the operation cost policy 1105, the storage controller 4 may determine the recovery means level 1001 for each error to "L7", which indicates the highest possibility of recovery.

For example, when "cost unlimited" is set in the operation cost policy 1105, the storage controller 4 may determine the recovery means level 1001 for each error to "L1" or "L8", which indicates the shortest period of recovery processing.

The storage controller 4 can refer to the customer policy management table 1100 to select an appropriate recovery means level 1001 in accordance with the configuration of a RAID group in which an error has occurred and the type of the error. Consequently, the storage controller 4 can recover the error in a shorter period and with a higher possibility.

The execution timing of the recovery processing may include "synchronous" indicating that the recovery processing is executed immediately when an error occurs and "asynchronous" indicating that the execution time of the recovery processing is scheduled when an error occurs. The storage controller 4 may select "synchronous" when recovery processing that completes in a relatively short period as represented by retry processing is executed. The storage controller 4 may select "asynchronous" when recovery processing that needs a relatively long period as represented by physical reset processing is executed.

The reason why the errors 1107, 1109, and 1110 are "L5" for the RAID group ID 1101 of "F-2" in the customer policy management table 1100 illustrated in FIG. 4 is that "SSD" represented by the drive type 1103 takes a relatively short time for physical reset processing and subsequent rebooting and does not have much adverse influence on operation performance.

FIG. 5 illustrates a configuration example of the drive failure management table 1200.

The drive failure management table 1200 manages errors that have occurred in each of drives 20 forming a RAID group. The drive failure management table 1200 may have, as item values (column values), a RAID group ID 1201, a drive number 1202, a status 1203, a system error count 1204, a data error count 1205, an I/F error count 1206, and a timeout error count 1207.

The RAID group ID 1201 is the same as the RAID group ID 1101 in the customer policy management table 1100. The drive number 1202 is the value for identifying each drive 20 in the RAID group having the ID 1201.

The status 1203 is the value representing the status of a drive 20 having the drive number 1202. Examples of the status include "active" indicating that the drive 20 is normally operating, "closed" indicating that the drive 20 is closed, and "diagnosis" indicating that the drive 20 is under recovery processing in an asynchronous manner. The "diagnosis" may indicate link diagnosis processing described later.

The system error count 1204 (may be referred to as hardware error count) is the value indicating the number of system errors that have occurred in a drive 20 having the drive number 1202 in a RAID group having the ID 1202.

The data error count 1205 is the value indicating the number of data errors that have occurred in the drive 20 having the drive number 1202 in the RAID group having the ID 1202.

The I/F error count 1206 is the value indicating the number of I/F errors that have occurred in the drive 20 having the drive number 1202 in the RAID group having the ID 1202.

The timeout error count 1207 is the value indicating the number of timeout errors that have occurred in the drive 20 having the drive number 1202 in the RAID group having the ID 1202.

The above-mentioned error counts 1204, 105, and 1206 may be the numbers of errors that have occurred in a predetermined period (for example, 24 hours). In this case, the number of errors that occurred before the predetermined period may be deleted after the predetermined period has elapsed.

The storage controller 4 may perform, for a drive 20 whose number of errors has become equal to or more than a predetermined threshold, recovery processing based on the recovery means level 1001 set in the customer policy management table 1100 for the RAID group to which the drive 20 belongs. The threshold may differ for each RAID group and each error type. Further, the threshold of a RAID group for which performance is given priority over cost in the operation policy may be smaller than the threshold of a RAID group for which cost is given priority over performance in the operation policy.

Note that the drive failure management table 1200 may manage occurrence times of errors in addition to the number of errors. Further, the storage controller 4 may have a table for managing failures in the EXP 600 and other devices similarly to the drive failure management table 1200.

Figure 6:
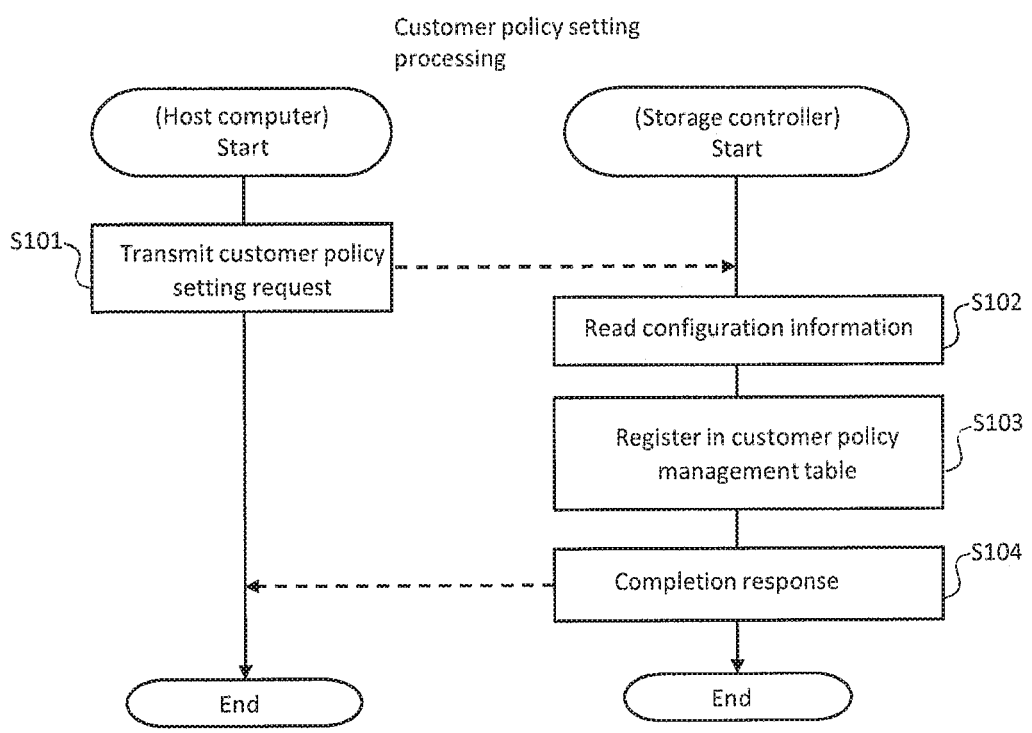
FIG. 6 is a flowchart illustrating an example of customer policy setting processing.

FIG. 6 is a flowchart illustrating an example of customer policy setting processing.

(S101) The host computer 10 transmits a customer policy setting request to the storage controller 4 in response to an instruction from a customer or on the basis of predetermined conditions. The customer policy setting request may include an operation performance policy 1104 and/or an operation cost policy 1105 for a RAID group.

(S102) When the storage controller 4 receives the customer policy setting request, the storage controller 4 reads configuration information on the storage system 1. The configuration information includes information on drives 20 constituting a RAID group. Then, the storage controller 4 proceeds to S103.

(S103) The storage controller 4 specifies a RAID group designated by the customer policy setting request on the basis of the read configuration information. Then, the storage controller 4 registers information on the specified RAID group and information included in the customer policy setting request in the customer policy management table 1100 in association with each other. Then, the storage controller 4 proceeds to S104.

(S104) The storage controller 4 transmits a completion response for the customer policy setting request to the host computer 10.

According to the processing described above, each RAID group is associated with customer operation policy and the recovery means level 1001 of an error corresponding to the operation policy.

Figure 7:
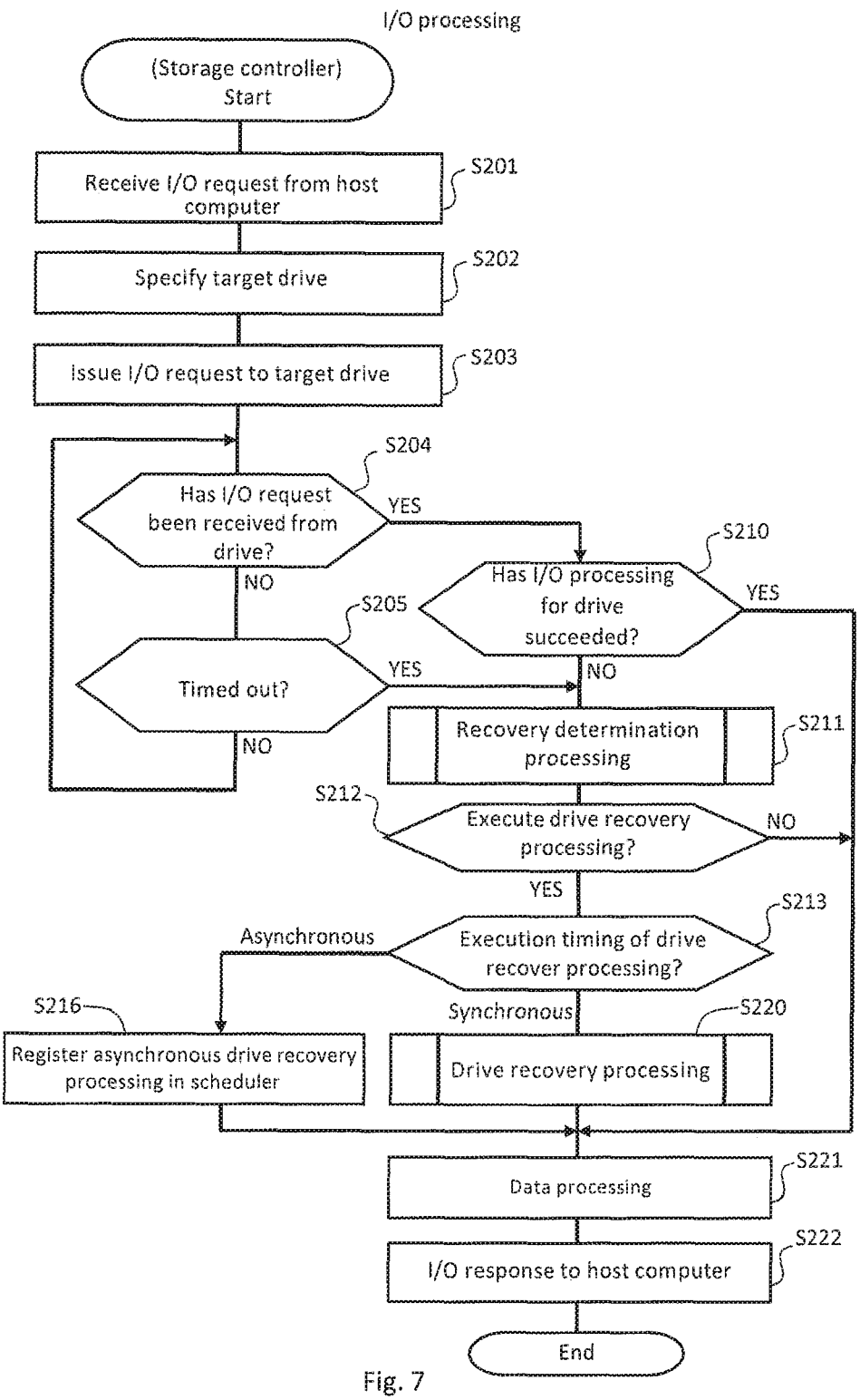
FIG. 7 is a flowchart illustrating an example of I/O processing.

FIG. 7 is a flowchart illustrating an example of I/O processing in the storage controller 4.

(S201) When the storage controller 4 receives an I/O request from the host computer 10, the storage controller 4 proceeds to S202.

(S202) The storage controller 4 specifies a drive 20 (RAID group) to be accessed on the basis of information included in the received I/O request. In the description with reference to FIG. 7, the specified drive 20 is referred to as "target drive". Then, the storage controller 4 proceeds to S203.

(S203) The storage controller 4 issues the I/O request received from the host computer 10 to the target drive 20. Then, the storage controller 4 proceeds to S204.

(S204) When the storage controller 4 receives an I/O response from the drive 20 (YES), the storage controller 4 proceeds to S210. When the storage controller 4 has not received an I/O response (NO), the storage controller 4 proceeds to S205.

(S205) When the I/O response is timed out (YES), the storage controller 4 proceeds to S211. When the I/O response is not timed out yet (NO), the storage controller 4 returns to S204.

(S210) When the I/O response is "successful" (YES), the storage controller 4 proceeds to S221. When the I/O response is "error" (NO), the storage controller 4 proceeds to S211.

(S211) When the I/O request has failed, such as "error" or being timed out, the storage controller 4 executes recovery determination processing. Details of this processing are described later (see FIG. 8). Then, the storage controller 4 proceeds to S212.

(S212) When the storage controller 4 determines in the recovery determination processing "to execute drive recovery processing", the storage controller 4 proceeds to S213. When the storage controller 4 determines "not to execute drive recovery processing", the storage controller 4 proceeds to S221.

(S213) When "synchronous" is selected as the execution timing of the drive recovery processing, the storage controller 4 proceeds to S220. When "asynchronous" is selected, the storage controller 4 proceeds to S216.

(S216) The storage controller 4 schedules the execution timing of the drive recovery processing. Then, the storage controller 4 proceeds to S221.

(S220) The storage controller 4 executes the drive recovery processing, and proceeds to S221.

(S221) The storage controller 4 executes data processing such as updating of various kinds of tables. Then, the storage controller 4 proceeds to S222.

(S222) The storage controller 4 returns the I/O response to the host computer.

According to the processing described above, whether the storage controller 4 can execute drive recovery processing for the target drive 20 in which the failure has occurred as necessary.

Figure 8:
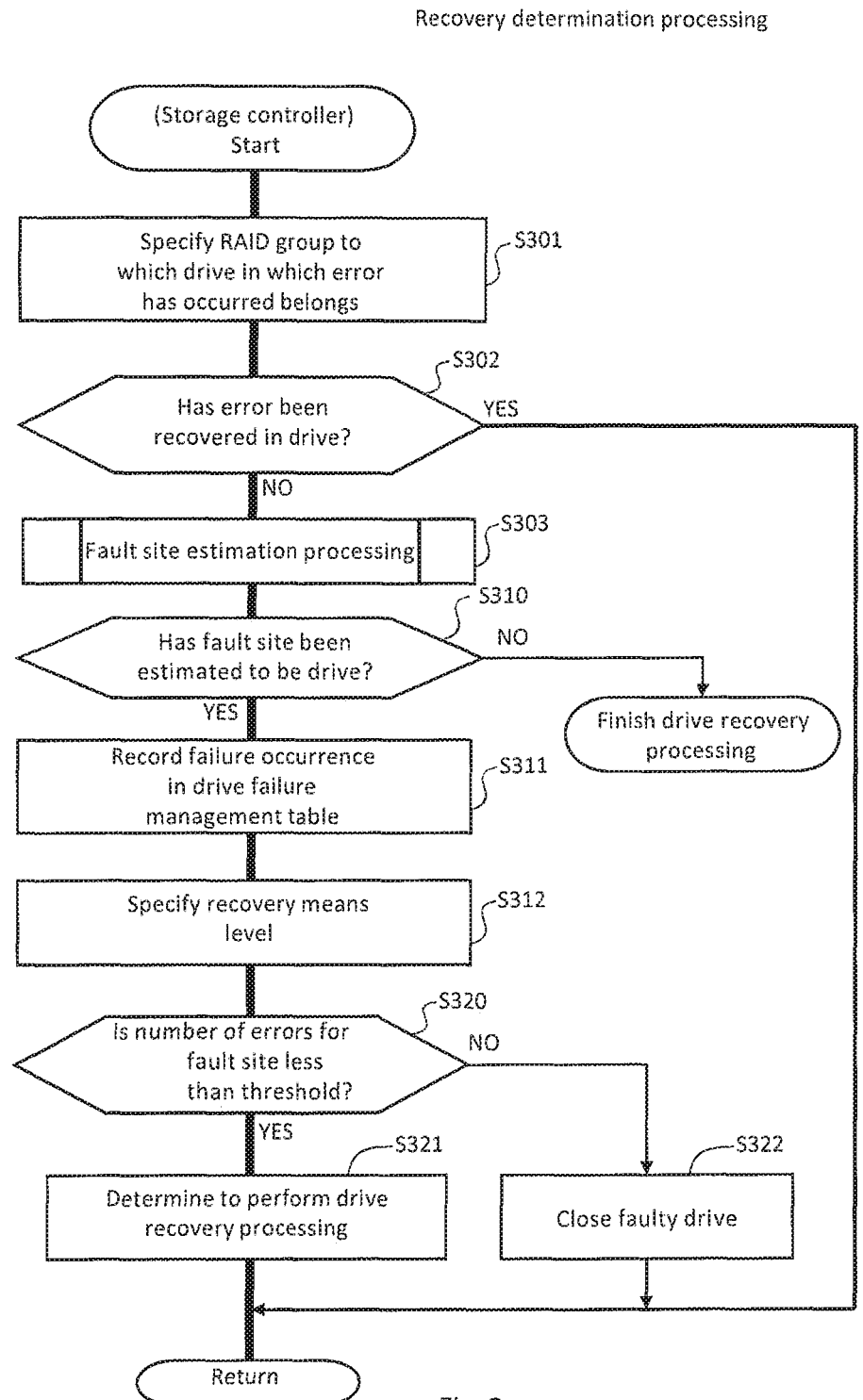
FIG. 8 is a flowchart illustrating an example of recovery determination processing.

FIG. 8 is a flowchart illustrating an example of recovery determination processing. This processing corresponds to S211 in FIG. 7.

(S301) The storage controller 4 specifies a RAID group to which a drive 20 in which an error has occurred belongs. Then, the storage controller 4 specifies an entry corresponding to an ID of the specified RAID group from the customer policy management table 1100. Then, the storage controller 4 proceeds to S302.

(S302) The storage controller 4 determines whether an error received from the drive 20 has recovered in the drive 20. When the determination result is positive (YES), the storage controller 4 returns to the processing in S211 and subsequent steps in FIG. 7. When the determination result is negative (NO), the storage controller 4 proceeds to S303.

(S303) The storage controller 4 executes fault site estimation processing. Details of this processing are described later (see FIG. 9). Then, the storage controller 4 proceeds to S304.

(S304) When the storage controller 4 estimates by the fault site estimation processing that the drive 20 is a fault site (YES), the storage controller 4 proceeds to S311. When the storage controller 4 estimates that a drive other than the drive 20 is a fault site (NO), the storage controller 4 finishes the drive recovery processing. In this case, recovery processing for another fault site may be executed.

(S311) The storage controller 4 increases the value of an item corresponding to the type of the error occurring due to the failure in an entry specified by the RAID group ID 1201 and the drive number 1202 in which the failure has occurred in the drive failure management table 1200 (that is, the number of errors in any one of item values 1204 to 1207). In this case, an error occurrence time may be registered in the item values 1204 to 1207. Then, the storage controller 4 proceeds to S312.

(S312) The storage controller 4 acquires, from the customer policy management table 1100, the value of the item corresponding to the type of the error occurring due to the failure in the entry specified by the RAID group ID 1101 in which the failure has occurred (that is, the recovery means level 1001 in any one of the item values 1107 to 1110). Then, the storage controller 4 proceeds to 5320.

(S320) The storage controller 4 acquires the number of errors increased in 5311 in the drive failure management table 1200, and determines whether the acquired number of errors is less than a threshold. When the determination result is positive (YES), the storage controller 4 proceeds to S321. When the determination result is negative (NO), the storage controller 4 proceeds to S322.

(S321) The storage controller 4 determines "to execute drive recovery processing" as the result of the recovery determination processing, and returns to the processing in S211 and subsequent steps in FIG. 7.

(S322) The storage controller 4 closes the drive 20 in which the failure has occurred. Then, the storage controller 4 determines "not to execute drive recovery processing" as the result of the recovery determination processing, and returns to the processing in S211 and subsequent steps in FIG. 7.

According to the processing described above, whether the storage controller 4 executes the drive recovery processing can be determined.

Figure 9:
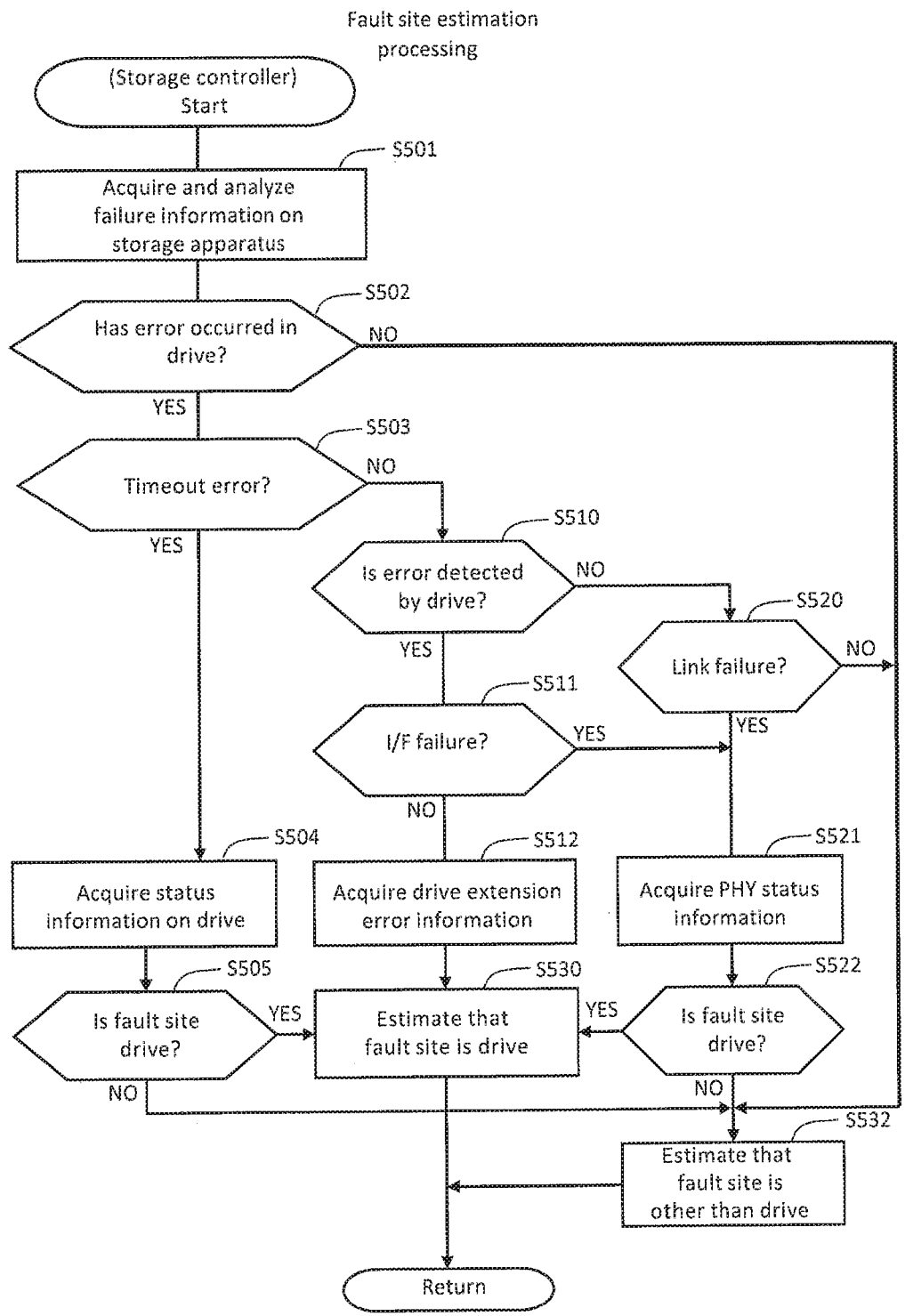
FIG. 9 is a flowchart illustrating an example of fault site estimation processing.

FIG. 9 is a flowchart illustrating an example of fault site estimation processing. This processing corresponds to S303 in FIG. 8.

(S501) The storage controller 4 acquires failure information on the entire storage system 1, and specifies a device in which an error has occurred and the type of the error on the basis of the acquired failure information. Then, the storage controller 4 proceeds to S502.

(S502) When the storage controller 4 specifies that the device in which the error has occurred is the drive 20 (YES), the storage controller 4 proceeds to S503. When the storage controller 4 specifies that the device in which the error has occurred is other than the drive 20 (NO), the storage controller 4 estimates that the fault site is other than the drive 20 (S532), and returns to S303 and subsequent steps in FIG. 8.

(S503) The storage controller 4 determines whether the error type is a timeout error. When the determination result is positive (YES), the storage controller 4 proceeds to S504. When the determination result is negative (NO), the storage controller 4 proceeds to S510.

(S504) The storage controller 4 acquires, from the drive 20 in which the error has occurred, status information on the drive 20. Then, the storage controller 4 proceeds to S505. The status information may include information on internal processing (also including internal error) of the drive 20.

(S505) The storage controller 4 estimates whether the fault site is the drive 20 on the basis of the acquired status information on the drive 20 and the like. When it is estimated that the fault site is the drive 20 (YES), the storage controller 4 proceeds to S530. When it is estimated that the fault site is other than the drive 20 (NO), the storage controller 4 proceeds to S532.

(S510) The storage controller 4 determines whether the error has been detected by the drive 20 on the basis of contents of an error response. When the determination result is positive (YES), the storage controller 4 proceeds to S511. When the determination result is negative (NO), the storage controller 4 proceeds to S520.

(S511) The storage controller 4 estimates whether the error is an I/F failure on the basis of contents of the error response. When it is estimated that the error is an I/F failure (YES), the storage controller 4 proceeds to S521. When it is estimated that the error is a failure other than the I/F failure (NO), the storage controller 4 proceeds to S512.

(S512) The storage controller 4 acquires, from the drive 20 in which the error has occurred, extension error information on the drive 20. The extension error information may include more detailed information on the error. Then, the storage controller 4 proceeds to S530.

(S520) The storage controller 4 estimates whether the error is a link failure on the basis of contents of the error response. When it is estimated that the error is a link failure (YES), the storage controller 4 proceeds to S521. When it is estimated that the error is a failure other than the link failure (NO), the storage controller 4 proceeds to S532.

(S521) The storage controller 4 acquires PHY status information 1300, which is an example of a failure log, from a drive 20 in which an error has occurred. Details of the PHY status information 1300 are described later (see FIG. 14). Then, the storage controller 4 proceeds to S522.

(S522) The storage controller 4 determines whether the fault site is the drive 20 on the basis of the acquired PHY status information 1300 and the like. When it is determined that the fault site is the drive 20 (YES), the storage controller 4 proceeds to S530. When it is determined that the fault site is other than the drive 20 (NO), the storage controller 4 proceeds to S532.

(S530) The storage controller 4 estimates that the fault site is the drive 20, and returns to S303 and subsequent steps in FIG. 8.

(S532) The storage controller 4 estimates that the fault site is other than the drive 20, and returns to S303 and subsequent steps in FIG. 8.

According to the processing described above, whether the fault site is the drive 20 can be isolated. Consequently, the possibility that a drive 20 in which a failure has not occurred is erroneously replaced can be reduced to reduce operation cost for customers.

Figure 10:
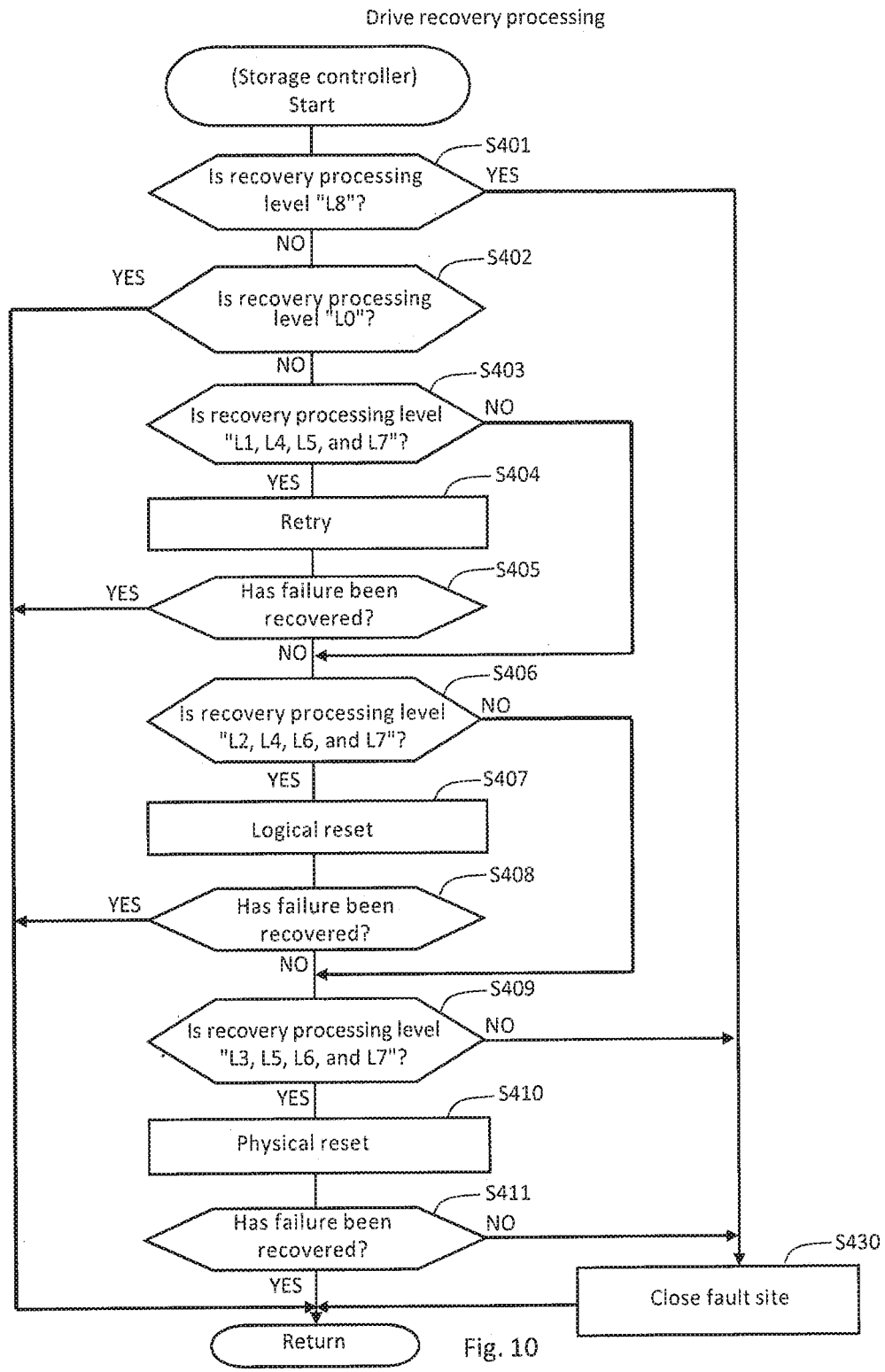
FIG. 10 is a flowchart illustrating an example of drive recovery processing.

FIG. 10 is a flowchart illustrating an example of drive recovery processing. This processing corresponds to S220 in FIG. 7.

(S401) When the recovery means level specified in S312 in FIG. 8 (referred to as "specified recovery means level" in the description with reference to FIG. 10) is "L8" (YES), the storage controller 4 closes the drive 20 estimated to be a fault site (S430), and returns to 5220 and subsequent steps in FIG. 7. When the specified recovery means level is other than "L8" (NO), the storage controller 4 proceeds to S402.

(S402) When the specified recovery means level is "L0" (YES), the storage controller 4 returns to S220 in FIG. 7 without any other processing. When the specified recovery means level is other than "L0" (NO), the storage controller 4 proceeds to S403.

(S403) When the specified recovery means level is any one of "L1, L4, L5, and L7" (YES), the storage controller 4 proceeds to S404. When the specified recovery means level is other than "L1, L4, L5, and L7" (NO), the storage controller 4 proceeds to S406.

(S404) The storage controller 4 executes retry processing as recovery processing. For example, the storage controller 4 retransmits an I/O request involving an error response to the drive 20 estimated to be a fault site. Then, the storage controller 4 proceeds to S405.

(S405) When the retransmission has succeeded (YES), the storage controller 4 returns to S220 and subsequent steps in FIG. 7 because the failure has recovered. When the retransmission has failed as well (NO), the storage controller 4 proceeds to S406.

(S406) When the specified recovery processing level is any one of "L2, L4, L6, and L7" (YES), the storage controller 4 proceeds to S407. When the specified recovery means level is other than "L2, L4, L6, and L7" (NO), the storage controller 4 proceeds to S409.

(S407) The storage controller 4 executes logical reset processing as recovery processing. For example, the storage controller 4 instructs the drive 20 estimated to be a fault site to execute logical reset processing. Then, after the logical reset processing for the drive 20 is completed, the storage controller 4 proceeds to S408.

(S408) The storage controller 4 retransmits an I/O request involving an error response to the drive 20 estimated to be a fault site. When the retransmission has succeeded (YES), the storage controller 4 returns to S220 and subsequent steps in FIG. 7 because the failure has recovered. When the retransmission has failed as well (NO), the storage controller 4 proceeds to S409.

(S409) When the specified recovery means level is any one of "L3, L5, L6, and L7" (YES), the storage controller 4 proceeds to S410. When the specified recovery means level is other than "L3, L5, L6, and L7" (NO), the storage controller 4 closes the drive 20 estimated to be a fault site (S430), and returns to S220 and subsequent steps in FIG. 7.

(S410) The storage controller 4 executes physical reset processing as recovery processing. For example, the storage controller 4 instructs the drive 20 that has been estimated to be the fault site to execute the physical reset processing. Then, after the physical reset processing for the drive 20 is completed, the storage controller 4 proceeds to S411.

(S411) The storage controller 4 retransmits an I/O request involving an error response to the drive 20 estimated to be a fault site. When the retransmission has succeeded (YES), the storage controller 4 returns to S220 and subsequent steps in FIG. 7 because the failure has recovered. When the retransmission has failed as well (NO), the storage controller 4 closes the drive 20 estimated to be a fault site, and returns to S220 and subsequent steps in FIG. 7.

According to the processing described above, when an error occurs, the failure recovery processing based on the recovery means level 1001 set in the customer policy management table 1100 is executed. Specifically, failure recovery processing suited to operation policies set by a customer is selected and executed.

Figure 11:
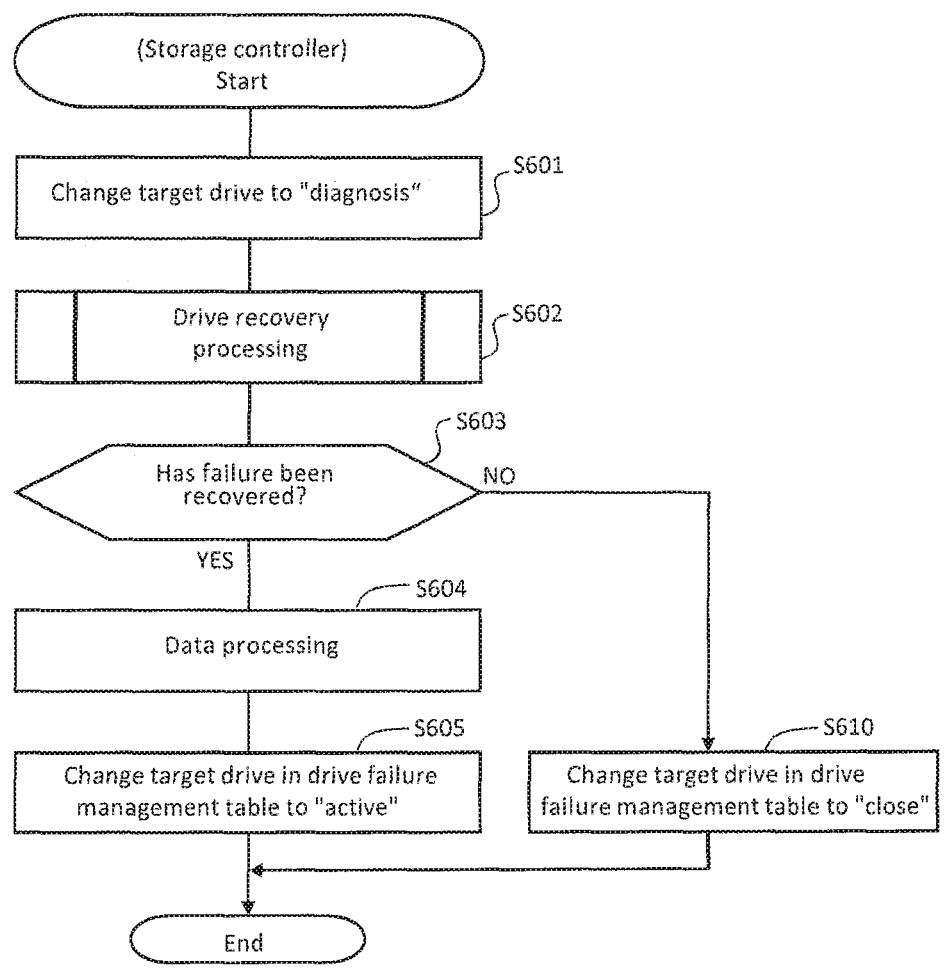
FIG. 11 is a flowchart illustrating an example of asynchronous drive recovery processing.

FIG. 11 is a flowchart illustrating an example of asynchronous drive recovery processing. This processing corresponds to drive recovery processing executed at the time registered in the scheduler in S216 in FIG. 7.

(S601) The storage controller 4 sets the drive 20 that is a recovery processing target (referred to as "target drive" in the description with reference to FIG. 11) to a diagnosis mode. Specifically, the storage controller 4 changes the status 1203 of the target drive 20 to "diagnosis" in the drive failure management table 1200. At this time, the storage controller 4 may temporarily close the target drive 20 and store I/O data received in the temporary closing period in a backup drive 20. When there is no backup drive 20, the storage controller 4 may subject a RAID group to which the target drive 20 belongs to fallback. In this case, the storage controller 4 changes the status 1106 of the RAID group to which the target drive 20 belongs to "fallback" in the customer policy management table 1100. Then, the storage controller 4 proceeds to S602.

(S602) The storage controller 4 executes drive recovery processing. This processing may be similar to the drive recovery processing illustrated in FIG. 10. Then, the storage controller 4 proceeds to S603.

(S603) The storage controller 4 determines whether the failure has recovered by the drive recovery processing in S602. When the failure has recovered (YES), the storage controller 4 proceeds to S604. When the failure has not recovered (NO), the storage controller 4 proceeds to S610.

(S604) The storage controller 4 performs predetermined data processing. For example, the storage controller 4 reflects I/O data stored in a backup drive 20 in the period during which the target drive 20 is temporarily closed to the target drive 20, and thereafter releases the closing of the target drive 20. Then, the storage controller 4 proceeds to S605.

(S605) The storage controller 4 changes the status 1203 of the target drive 20 to "active" in the drive failure management table 1200. Further, when the RAID group is subjected to fallback, the storage controller 4 changes the status 1106 of the RAID group to which the target drive 20 belongs to "normal" in the customer policy management table 1100. Then, the storage controller 4 finishes this processing.

(S610) The storage controller 4 changes the status 1203 of the target drive 20 to "closed" in the drive failure management table 1200. This is because the target drive 20 involves no failure recovery and has been closed in S430 in FIG. 10. Then, the storage controller 4 finishes this processing.

According to the processing described above, recovery processing is not performed immediately at timing at which a failure occurred, but the recovery processing can be executed at a subsequent appropriate timing. The appropriate timing is not limited to a time registered in the scheduler as described above, buy may be, for example, a timing at which the load on I/O processing of the storage controller 4 is low (less than predetermined threshold).

Figure 12:
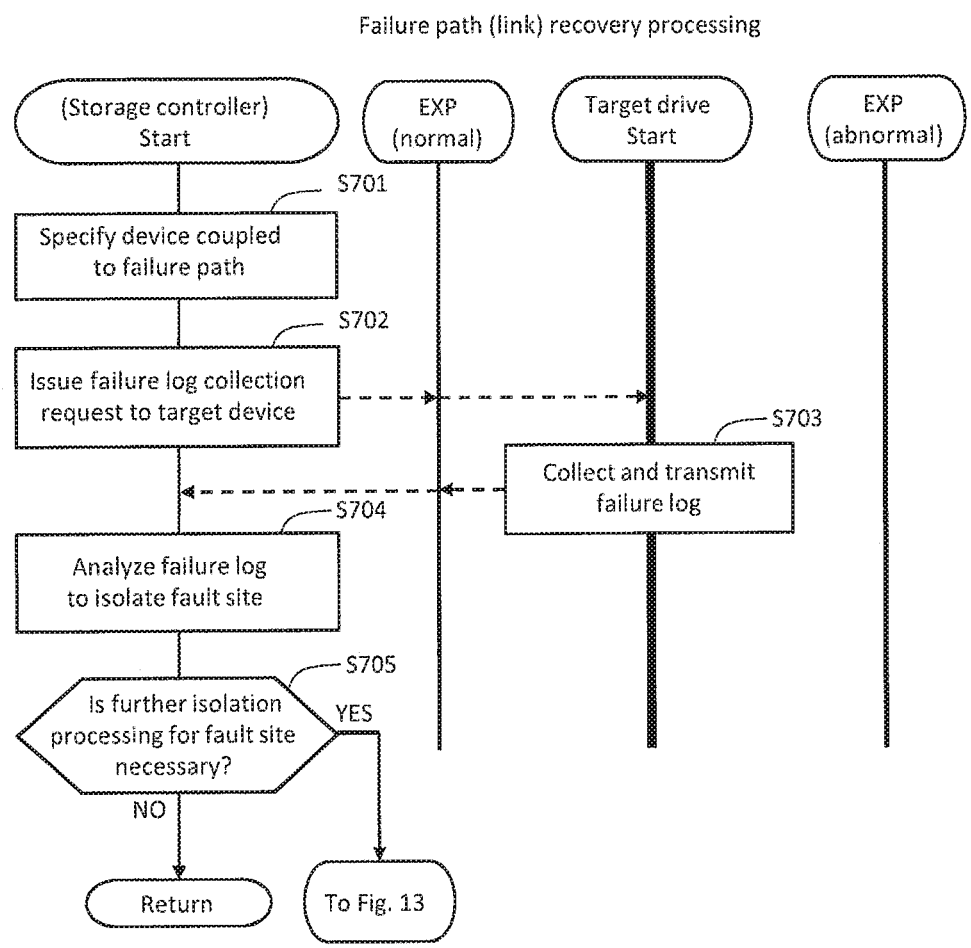
FIG. 12 is a flowchart illustrating an example of fault path (link) recovery processing.

FIG. 12 is a flowchart illustrating an example of fault path (link) recovery processing.

This processing may be an example of the processing of 5521 and S522 in FIG. 9. Alternatively, this processing may be processing to be executed only when, in the customer policy management table 1100, the recovery means level 1001 corresponding to a RAID group to which a drive 20 in which an error has occurred belongs involves physical reset processing.

(S701) The storage controller 4 specifies a drive 20 coupled to a path in which a failure has occurred (referred to as "abnormal system path") . The specified drive is referred to as "target drive" in the description with reference to FIG. 12 and FIG. 13. Then, the storage controller 4 proceeds to S702.

(S702) The storage controller 4 transmits a failure log collection request to the target drive 20 via a path in which no failure has occurred (referred to as "normal system path").

(S703) When the target drive 20 receives the failure log collection request, the target drive 20 collects failure logs (for example, PHY status information 1300). Details of the PHY status information 1300 and a collection method therefor are described later. Then, the target drive 20 transmits the collected failure logs to the storage controller 4 via the normal system path.

(S704) When the storage controller 4 receives the failure log, the storage controller 4 isolates which of the drive 20 and the EXP 600 is a fault site on the basis of the received failure log. Details of the isolation method are described later (see FIG. 15). Then, the storage controller 4 proceeds to S705.

(S705) The storage controller 4 determines whether processing of further isolating a fault site is necessary. When the storage controller 4 cannot isolate which of the drive 20 and the EXP 600 is a fault site in S704, the storage controller 4 may determine further isolation processing is necessary. When the determination result is positive (YES), the storage controller 4 proceeds to S710 in FIG. 13. When the determination result is negative (NO), the storage controller 4 returns to S521 and subsequent steps in FIG. 9. This is because which of the drive 20 and the EXP 600 is a fault site has successfully been estimated. Note that the storage controller 4 may proceed to S710 in FIG. 13 when it is estimated in S704 that the EXP 600 is a fault site.

Figure 13:
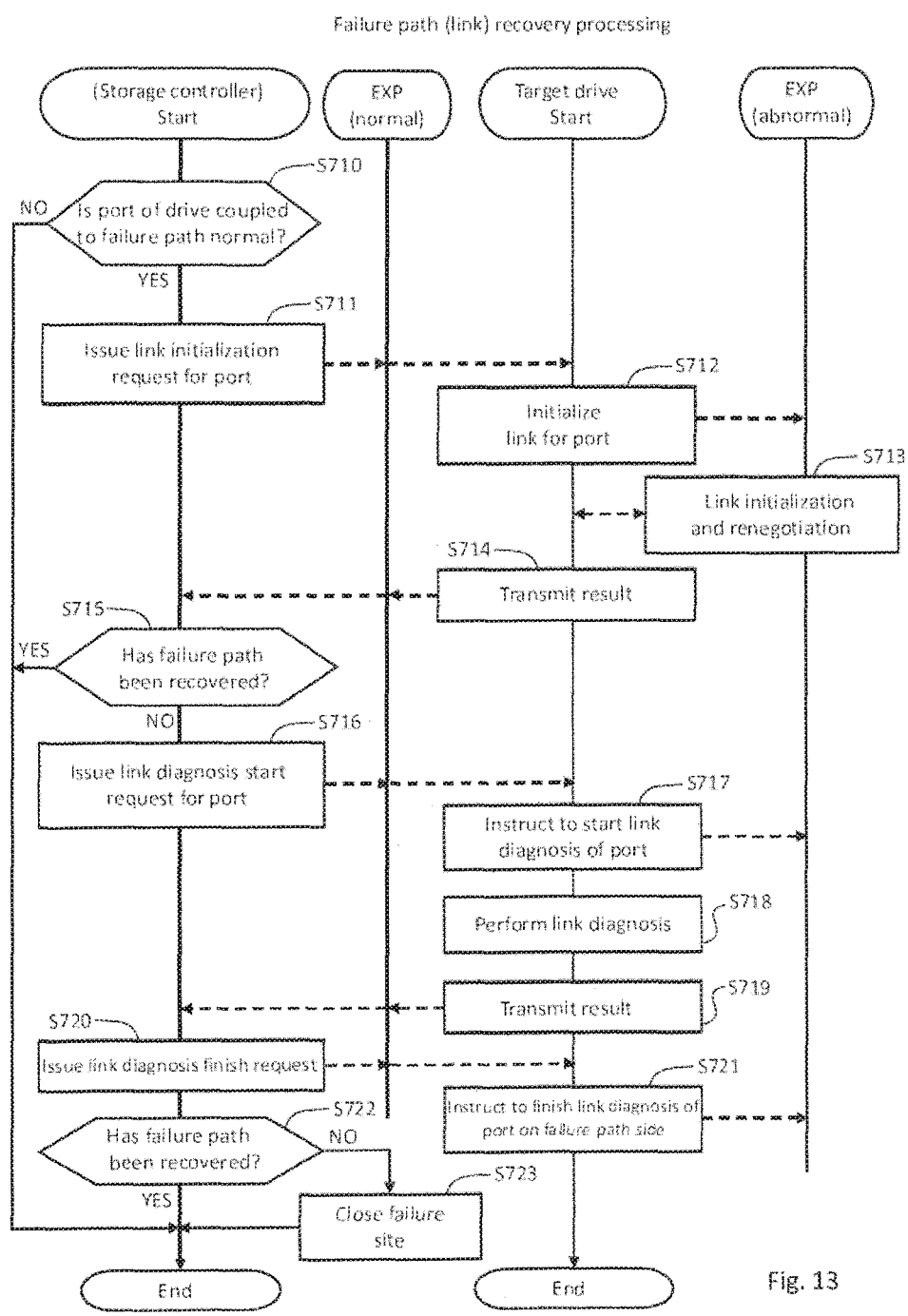
FIG. 13 is a flowchart illustrating the continuation of the fault path (link) recovery processing in FIG. 12.

FIG. 13 is a flowchart illustrating the continuation of the fault path recovery processing in FIG. 12.

(S710) The storage controller 4 determines from the failure log whether a port coupled to an abnormal system path of the target drive 20 (referred to as "target port" in the description with reference to FIG. 13) is normal. When the determination result is positive (YES), the storage controller 4 proceeds to 5711. When the determination result is negative (NO), the storage controller 4 finishes this processing.

(S711) The storage controller 4 transmits a request to initialize a link of the target port to the target drive 20 via the normal system path.

(S712) When receiving the link initialization request, the target drive 20 starts the processing of initializing the link of the target port.

(S713) In response to the link initialization processing, the EXP 600 coupled to the target port also executes link initialization processing and renegotiation processing for the target port. As a result, the link between the target drive 20 and the EXP 600 (that is, abnormal system path) is initialized.

(S714) The target drive 20 transmits the result of the processing of initializing the link of the target port to the storage controller 4. This result may include information indicating whether the link initialization has succeeded or failed and information indicating whether the transmission and reception of test data has succeeded or failed.

(S715) When receiving the result of the link initialization from the target drive 20, the storage controller 4 determines from the result whether the fault path has recovered. When the determination result is positive (YES), the storage controller 4 finishes this processing. This is because the fault path has recovered. When the determination result is negative (NO), the storage controller 4 proceeds to S716. This is because more powerful fault path recovery processing is to be performed.

(S716) The storage controller 4 transmits a request to start diagnosing the link of the target port to the target drive 20 via the normal system path.

(S717) When receiving the link diagnosis processing start request from the storage controller 4, the target drive 20 instructs the EXP 600 coupled to the target port to start the link diagnosis processing.

(S718) The target drive 20 executes the link diagnosis processing for the EXP 600 coupled to the target port. Details of the link diagnosis processing are described later (see FIG. 16).

(S719) The target drive 20 transmits the result of the link diagnosis processing to the storage controller 4 via the normal system path.

(S720) When receiving the result of the link diagnosis processing from the target drive 20, the storage controller 4 transmits a request to finish the link diagnosis processing to the target device.

(S721) When receiving the link diagnosis processing finish request, the target drive 20 instructs the EXP 600 coupled to the target port to finish the link diagnosis processing.

(S722) The storage controller 4 determines from the result of the link diagnosis processing received from the target drive 20 whether the fault path has recovered. When the determination result is positive (YES), the storage controller 4 finishes this processing. This is because the fault path has recovered. When the determination result is negative (NO), the storage controller 4 closes the target port (or target drive 20) at the fault site, and finishes this processing. This is because the recovery processing has failed to recover the failure.

According to the processing described above, a fault path may be recovered. This is because the link initialization processing and the link diagnosis processing are processing similar to physical reset processing for a communication I/F device.

FIG. 14 illustrates a configuration example of the PHY status information.

The PHY status information 1300 includes information on whether what kind of types of link errors and how many link errors have occurred at each port included in the drive 20.

The types of link errors may conform to SAS standards. Examples of the link error types include Invalid Dword Count, Running Disparity Error Count, Loss Of Dword Sychroinization, and PHY Reset Problem.

In S702 in FIG. 12, the storage controller 4 acquires the PHY status information 1300 from the drive 20, and analyzes the PHY status information 1300 to isolate which of the drive 20 and the EXP 600 is a fault site. Next, an example of a method of isolating a fault site is described.

FIG. 15 is a diagram for describing a method of isolating a fault site.

It is assumed that a port P1 for an EXP-A and a port P1 for a drive 20 are coupled to each other and a port P2 for an EXP-B and a port P2 for the drive 20 are coupled to each other.

When the storage controller 4 determines from the result of analysis of the PHY status information 1300 that the PHY status information 1300 corresponds to a pattern "1" in FIG. 15, the storage controller 4 may estimate that the EXP-A is a fault site. Specifically, when the numbers of errors of both the ports P1 and P3 for the EXP-A have increased, the number of errors of the port P1 for the drive 20 coupled to the EXP-A has increased, and the number of errors of the port P2 for a drive 20 not coupled to the EXP-A has not increased, the storage controller 4 may estimate that the EXP-A is a fault site.

When the storage controller 4 determines from the result of analysis of the PHY status information 1300 that the PHY status information 1300 corresponds to a pattern "2" in FIG. 15, the storage controller 4 may estimate that the drive 20 is a fault site. Specifically, when the numbers of errors of both the ports P1 and P2 for the drive 20 have increased, the numbers of errors of the port P1 for the EXP-A and the port P2 for the EXP-B coupled to the drive 20 have both increased, and the numbers of errors of the port P3 for the EXP-A and the port P4 for the EXP-B not coupled to the drive 20 have not increased, the storage controller 4 may estimate that the drive 20 is a fault site.

When the storage controller 4 determines that the PHY status information 1300 corresponds to the pattern "1" or "2" in FIG. 14, the storage controller 4 may determine in S705 in FIG. 12 that further isolation of the fault site is unnecessary.

When the storage controller 4 determines from the result of analysis of the PHY status information 1300 that the PHY status information 1300 corresponds to a pattern "3" in FIG. 15, the storage controller 4 cannot isolate whether the drive 20 or the EXP 600 is a fault site. Specifically, when the number of errors of the port P1 for the EXP-A coupled to the drive 20 has increased but the number of errors of the port P1 for the drive 20 coupled to the EXP-A has not increased or when the number of errors of the port P1 for the drive 20 coupled to the EXP-A has increased but the number of errors of the port P1 for the EXP-A coupled to the drive 20 has not increased, the storage controller 4 cannot isolate whether the drive 20 or the EXP 600 is a fault site. In this case, the storage controller 4 may determine in S705 in FIG. 12 that further isolation of a fault site is necessary and execute the processing in FIG. 13.

According to the processing described above, whether a fault site is a drive 20 can be isolated. Consequently, the possibility that a drive 20 in which a failure has not occurred is erroneously replaced can be reduced to reduce operation cost for customers.

Figure 16:
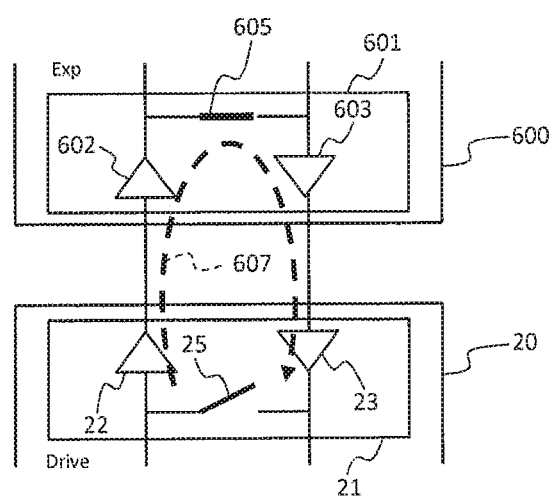
FIG. 16 is a diagram for describing link diagnosis processing.

FIG. 16 is a diagram for describing link diagnosis processing. This processing corresponds to the processing of S718 in FIG. 13.

In FIG. 16, a port unit 21 in a drive 20 and a port unit 601 in an EXP 600 are coupled to each other.

On a physical layer and a data link layer, a data signal transmitted from the port unit 21 in the drive 20 is transmitted from a transmission unit 22 included in the port unit 21 and is received by a reception unit 602 included in the port unit 601 in the EXP 600. A data signal transmitted from the port unit 601 in the EXP 600 is transmitted from a transmission unit 603 included in the port unit 601 in the EXP 600 and is received by a reception unit 23 included in the port unit 21 in the drive 20.

The port unit 21 in the drive 20 may have a switch 25 capable of switching on/off between the reception unit 23 and the transmission unit 22. The port unit 601 in the EXP 600 may have a switch 605 capable of switching on/off between the reception unit 602 and the transmission unit 603.

When the drive 20 performs link diagnosis processing for the port unit 21, the drive 20 turns on the switch 605 of the port unit 601 for the EXP 600. As a result, the drive 20 can receive a data signal transmitted from the transmission unit 22 by the reception unit 23 via the turned-on switch 605 for the EXP 600. Such link diagnosis processing may be called "loopback diagnosis processing".

The drive 20 may store the result of the link diagnosis processing in the PHY status information 1300. Then, in S719 in FIG. 13, the drive 20 may transmit the PHY status information 1300 to the storage controller 4 as the diagnosis result.

According to the processing described above, the fault path may be recovered. This is because the link diagnosis processing is processing similar to physical reset processing for a communication I/F device.

Note that the following embodiments are conceivable.
<Example of Estimation of Fault Site>

The storage controller 4 may estimate an error type and a fault site on the basis of a log of the entire storage device, a failure log of a drive 20 in which an error has occurred, and a log related to the drive 20. For example, in the case where an error is a timeout error, the storage controller 4 may estimate that a drive other than the drive 20 (for example, link system) is a fault site when a failure log for the drive 20 in which the error has occurred indicates that the processing for the drive 20 has completed, and may estimate that the drive 20 is a fault site when the failure log indicates that the processing for the drive 20 is underway. When the drive 20 is estimated to be a fault site, the failure may be recovered by the physical reset processing for the drive 20.
<Example of Selection of Recovery Processing>

The storage controller 4 may select a recovery means level 1001 on the basis of redundancy of a RAID group to which a drive 20 in which an error has occurred at that time. For example, when the RAID level of the RAID group is "6" and there is no closed drive 20 in the RAID group at this time point, the storage controller 4 may select a recovery means level 1001 of "L1". For example, when the RAID level of the RAID group is "6" and there is one closed drive 20 in the RAID group at this time point, the storage controller 4 may select a recovery means level 1001 of "L2". For example, when the RAID level of the RAID group is "6" and there are two closed drives 20 in the RAID group at this time point, the storage controller 4 may select a recovery means level 1001 of "L5" (that is, not to close the drive). This is because the redundancy is greatly lost if any more storages are closed.

The storage controller 4 may adjust the recovery means level 1001 in the customer policy management table 1100 on the basis of the types of errors that have occurred in the past and the probability by which a failure has recovered by recovery processing executed for the errors. For example, when the probability by which a failure has recovered by retry processing is relatively high (equal to or more than a predetermined threshold), the storage controller 4 may increase the recovery means levels 1001 of "L1, L4, L5, and L7", which involve retry processing, in the customer policy management table 1100. For example, when the probability by which a failure has recovered by retry processing is relatively low (less than the predetermined threshold), the storage controller 4 may increase the recovery means levels 1001 of "L2, L3, and L6", which do not involve retry processing, in the customer policy management table 1100.

The above-mentioned embodiment is illustrative for the description of this invention, and is not intended to limit the scope of this invention to only the embodiment. Persons skilled in the art can carry out this invention in other various modes without departing from the gist of this invention.

REFERENCE SIGNS LIST

1 Storage system
4 Storage controller
10 Host computer
12 Management computer
20 Drive
600 SAS expander

The invention claimed is:

1. A storage system comprising:
   a plurality of RAID groups constructed by plurality of storage devices; and
   a storage controller configured to control the RAID groups, wherein
   the storage controller has policy management information in which any one of a plurality of different kinds of failure recovery processing is associated with each of the RAID groups, and
   when an error for a command issued to one of the RAID groups is detected, the storage controller specifies, on the basis of the policy management information, failure recovery processing associated with the RAID group to which the command is issued, and executes the specified failure recovery processing,
   wherein, in each RAID group, an operation policy for the RAID group is set, and
   wherein in the policy management information, failure recovery processing adapted to an operation policy set for the RAID group among the plurality of different kinds of failure recovery processing is associated with each RAID group.

2. The storage system according to claim 1, wherein the plurality of different kinds of failure recovery processing include at least failure recovery processing for performing logical reset processing of the storage device and failure recovery processing for performing physical reset processing of the storage device.

3. The storage system according to claim 2, wherein the plurality of different kinds of failure recovery processing include at least failure recovery processing for performing physical reset processing of a storage device when a failure is not recovered by logical resetting processing of the storage device.

4. The storage system according to claim 2, wherein
in the policy management information,
failure recovery processing including the physical reset processing is associated with a RAID group for which an operation policy that gives priority to cost is set, and
failure recovery processing including the logical reset processing is associated with a RAID group for which an operation policy that gives priority to performance is set.

5. The storage system according to claim 2, wherein
in the policy management information, failure recovery processing is associated for each type of a detected error, and
the storage controller is configured to execute failure recovery processing specified by a RAID group to which the command is issued, and the type of the detected error in the policy management information.

6. The storage system according to claim 5, wherein
the type of the error includes at least an error relating to hardware of the storage device and an error relating to data of the storage device, and
in at least part of the policy management information,
an error relating to hardware of the storage device is associated with failure recovery processing including the physical reset processing, and
an error relating to data of the storage device is associated with failure recovery processing including the logical reset processing.

7. The storage system according to claim 6, wherein
the type of the error further includes an error relating to a network interface of the storage device, and
in at least part of the policy management information, when an error relating to the network interface of the storage device is associated with failure recovery processing including the physical reset processing, the storage controller executes of link diagnosis processing between the storage device and a device to which the network interface is coupled.

8. The storage system according to claim 1, wherein
the storage controller is configured to:
acquire, when the detected error is a timeout error, status information on a storage device to which the command is issued;
estimate, on the basis of the acquired status information, whether a cause of the error is the storage device; and
execute, when it is estimated that the storage device is the cause of the error, failure recovery processing associated with a RAID group to which the storage device belongs in the policy management information.

9. The storage system according to claim 1, wherein
when the storage controller receives, from a predetermined computer, a setting request for an operation policy of a RAID group, the storage controller sets the requested operation policy to the RAID group.

10. A method of managing a storage including: a plurality of RAID groups constructed by a plurality of storage devices; and a storage controller configured to control the RAID groups,
the storage controller, when an error for a command issued to one of the RAID groups is detected:
specifies, on the basis of the policy management information, in which each RAID group is associated with any failure recovery processing among a plurality of different kinds of failure recovery processing, failure recovery processing associated with the RAID group to which the command is issued; and
executes the specified failure recovery processing,
wherein, in each RAID group, an operation policy for the RAID group is set, and
wherein in the policy management information, failure recovery processing adapted to an operation policy set for the RAID group among the plurality of different kinds of failure recovery processing is associated with each RAID group.

11. The method according to claim 10, wherein
the plurality of different kinds of failure recovery processing include at least failure recovery processing for performing logical reset processing of the storage device and failure recovery processing for performing physical reset processing of the storage device.

12. The method according to claim 10, wherein
the plurality of different kinds of failure recovery processing include at least failure recovery processing for performing physical reset processing of a storage device when a failure is not recovered by logical resetting processing of the storage device.

13. The method according to claim 11, wherein
in the policy management information,
failure recovery processing including the physical reset processing is associated with a RAID group for which an operation policy that gives priority to cost is set, and
failure recovery processing including the logical reset processing is associated with a RAID group for which an operation policy that gives priority to performance is set.

14. The method according to claim 11, wherein
in the policy management information, failure recovery processing is associated for each type of a detected error, and
the storage controller executes failure recovery processing specified by a RAID group to which the command is issued, and the type of the detected error in the policy management information.

15. The method according to claim 14, wherein
the type of the error includes at least an error relating to hardware of the storage device and an error relating to data of the storage device, and
in at least part of the policy management information,
an error relating to hardware of the storage device is associated with failure recovery processing including the physical reset processing, and
an error relating to data of the storage device is associated with failure recovery processing including the logical reset processing.

16. The method according to claim 15, wherein
the type of the error further includes an error relating to a network interface of the storage device, and
in at least part of the policy management information, when an error relating to the network interface of the storage device is associated with failure recovery processing including the physical reset processing, the storage controller executes of link diagnosis processing between the storage device and a device to which the network interface is coupled.

17. The method according to claim 10, wherein
the storage controller:
acquires, when the detected error is a timeout error, status information on a storage device to which the command is issued;
estimates, on the basis of the acquired status information, whether a cause of the error is the storage device; and executes, when it is estimated that the storage device is the cause of the error, failure recovery processing associated with a RAID group to which the storage device belongs in the policy management information.

18. The method according to claim 10, wherein when the storage controller receives, from a predetermined computer, a setting request for an operation policy of a RAID group, the storage controller sets the requested operation policy to the RAID group.

* * * * *